US007438351B2

(12) United States Patent
Arroupe et al.

(10) Patent No.: US 7,438,351 B2
(45) Date of Patent: Oct. 21, 2008

(54) STRUCTURAL ELEMENT COMPRISING A VERTICAL MEMBER SECURING NUT AND THE CORRESPONDING MOTOR VEHICLE

(75) Inventors: Philippe Arroupe, Meru (FR); Laurent Baudart, Meru (FR); Tetsuji Kurokawa, Meru (FR)

(73) Assignee: Faurecia Interieur Industrie (FR)

( * ) Notice: Subject to any disclaimer, the term of this patent is extended or adjusted under 35 U.S.C. 154(b) by 358 days.

(21) Appl. No.: 10/519,575

(22) PCT Filed: Jul. 2, 2003

(86) PCT No.: PCT/FR03/02062

§ 371 (c)(1), (2), (4) Date: Nov. 16, 2005

(87) PCT Pub. No.: WO2004/005116

PCT Pub. Date: Jan. 15, 2004

(65) Prior Publication Data
US 2006/0138806 A1    Jun. 29, 2006

(30) Foreign Application Priority Data
Jul. 3, 2002    (FR) ................... 02 08333

(51) Int. Cl.
B62D 25/14    (2006.01)
(52) U.S. Cl. ................... 296/193.02; 296/70
(58) Field of Classification Search ............ 296/193.02, 296/70, 72
See application file for complete search history.

(56) References Cited

U.S. PATENT DOCUMENTS 4,826,374 A * 5/1989 Baglin .................. 411/103
4,830,557 A * 5/1989 Harris et al. ............. 411/113
4,863,327 A * 9/1989 Poupiter ................... 411/112
4,875,816 A * 10/1989 Peterson ................... 411/104
5,193,868 A * 3/1993 O'Toole ................ 292/341.15
5,492,388 A    2/1996 Kawasaki
5,558,369 A * 9/1996 Cornea et al. ............. 280/800
5,605,353 A * 2/1997 Moss et al. ................ 280/784
6,062,602 A    5/2000 Biesinger et al.
6,062,791 A    5/2000 Simon
6,146,071 A * 11/2000 Norkus et al. ............. 411/104
6,811,363 B1 * 11/2004 Minnich ................... 411/104
2008/0048470 A1* 2/2008 Vican ................... 296/193.02

FOREIGN PATENT DOCUMENTS

DE    100 15 956    10/2001
EP    0 636 800 A1    2/1995
FR    2 766 783 A1    2/1999

* cited by examiner

Primary Examiner—Dennis H Pedder
(74) Attorney, Agent, or Firm—Lowrie, Lando & Anastasi, LLP

(57) ABSTRACT

The motor vehicle structural element (3) comprises a cross-member (4) and, at least one end (5) of the cross-member, a first nut (10) presenting a tapped bore (14) for receiving a screw (11) for fastening the cross-member to an upright (2) of the vehicle, the axis of the tapped bore being substantially parallel to the director line (L) of the cross-member. The element further comprises a first cage (20) for preventing the nut (10) from turning about the axis of its tapped bore, the first cage (20) being mounted at said end (5) of the cross-member, and the nut (10) being capable of moving in the first cage in translation substantially perpendicularly to the axis of its tapped bore.

10 Claims, 9 Drawing Sheets

STRUCTURAL ELEMENT COMPRISING A VERTICAL MEMBER SECURING NUT AND THE CORRESPONDING MOTOR VEHICLE

CROSS-REFERENCE TO RELATED APPLICATIONS

This application claims the right of priority under 35 U.S.C. §365(a) to commonly owned International Patent Application PCT/FR2003/002062, entitled STRUCTURAL ELEMENT COMPRISING A VERTICAL MEMBER SECURING NUT AND THE CORRESPONDING MOTOR VEHICLE filed on Jul. 2, 2003, which claims the right of priority to French Application FR02/08333, filed on Jul. 3, 2002, each of which are incorporated herein by reference in their entireties.

BACKGROUND OF THE INVENTION

The present invention relates to a motor vehicle structural element of the type comprising a cross-member and, at at least one end of the cross-member, a first nut presenting a tapped bore for receiving a screw for fastening the cross-member to an upright of the vehicle, the axis of the bore being substantially parallel to the director line of the cross-member.

DESCRIPTION OF RELATED ART

The invention applies in particular to a structural element for supporting the dashboard of a motor vehicle.

The director line of the cross-member then extends substantially along the transverse horizontal direction of the motor vehicle, generally referred to as the Y axis.

FR-2 770 481 and FR-2 757 473 describe such structural elements. Each nut is associated therein with a complex and expensive fastener system that is not suitable for taking up manufacturing clearances that are orthogonal to the director line of the cross-member.

FR-2 766 783 describes a structural element of the above-specified type in which the nut is mounted at the corresponding end of the cross-member via a member that pivots about a vertical axis relative to the cross-member.

The nut is held to the pivoting member by metal strands that allow it to pivot relative to the member about a vertical axis. That system with dual pivoting about vertical axes enables a certain amount of manufacturing tolerance to be taken up in directions that are orthogonal to the director line of the cross-member.

Nevertheless, such a structural element is expensive to make because of the complexity of the dual-pivoting system.

SUMMARY OF THE INVENTION

The invention is directed to an element which enables tolerances to be taken up that are, for example, orthogonal to the director line of the cross-member, which element is also of low cost.

To this end, the invention provides a structural element of the above-specified type, characterized in that it comprises a first cage for preventing the nut from turning about the axis of its tapped bore, the first cage being mounted at said end of the cross-member, and the nut being free to move in the first cage in translation substantially perpendicularly to the axis of its bore.

In other particular embodiments of the invention, the element may comprise one or more of the following characteristics, taken in isolation or in any technically feasible combination:

the first cage is mounted at the end of the cross-member by welding;

the first cage is mounted at the end of the cross-member by screw fastening;

the first cage is mounted at the end of the cross-member by crimping;

the element includes a sleeve via which the first cage is mounted to the end of the cross-member;

the element further comprises a plate secured to the sleeve and on which the cage is provided;

the element includes a spacer device for co-operating with the screw to bear against the end of the cross-member and against the upright along the director line of the cross-member;

a helical connection is provided between the first cage and the end of the cross-member, said helical connection being oppositely handed relative to the helical connection that arises from the screw being screwed into the first nut, so that the first cage comes to bear against the upright along the director line of the cross-member while the screw is being screwed into the first nut;

the spacer device comprises a second nut presenting a tapped bore for receiving the screw, the axis of the bore being substantially parallel to the director line of the cross-member, in that the spacer device further comprises a second cage for preventing the second nut from turning about the axis of its bore, and in that a helical connection is provided between the second cage and the end of the cross-member, said helical connection being oppositely handed relative to the helical connection that arises from screwing the screw into the second nut, so that the second cage comes to bear against the upright along the director line of the cross-member while the screw is being screwed into the second nut; and the cross-member is a cross-member for a supporting a motor vehicle dashboard.

The invention also provides a motor vehicle, characterized in that it includes a structural element as defined above.

BRIEF DESCRIPTION OF THE DRAWINGS

The invention will be better understood on reading the following description given purely by way of example and made with reference to the accompanying drawings, in which.

DETAILED DESCRIPTION

Throughout the text below, the orientations used are the orientations that are usual for a motor vehicle. Thus, terms such as "front," "rear," "right," and "left," extend relative to the forward travel direction of the vehicle and to the position of a driver and not intended to limit the scope of the claims.

In order to facilitate the description, the figures show an orthogonal frame of reference Oxyz in compliance with the terminology that is typically used in the automotive field.

Figure 1:
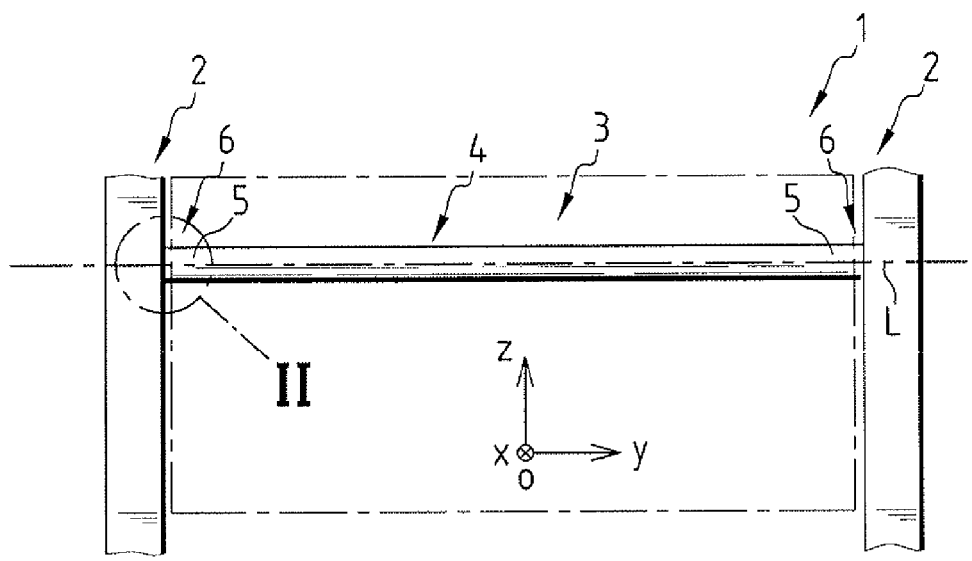
FIG. 1 is a diagrammatic fragmentary view from behind of a portion of the body of a motor vehicle in a first embodiment of the invention.

FIG. 1 is a diagram showing a portion of the body 1 of a motor vehicle, which body typically has two substantially vertical side uprights 2 and a structural element 3 interconnecting the two uprights 2.

Typically, the uprights 2 are so-called "A" uprights. These uprights 2 can be situated between the fenders of the bodywork of a motor vehicle and the front doors of the vehicle.

The structural element 3 can comprise a cross-member 4 which extends along a director line L that is substantially parallel to the horizontal transverse direction Oy.

By way of example, this cross-member 4 is a metal tube of circular section.

The side ends 5 of the cross-member 4 are typically fastened to respective uprights 2 via, for example, respective fastening systems 6.

The fastening systems 6 are of structures that are typically substantially symmetrical about the vertical midplane parallel to the plane Oxz, so only the structure of the left system 6 and the way it co-operates with the left upright 2 are described below with reference to FIGS. 2 to 5.

The fastener system 6 can comprise:
a nut 10 associated with the end 5 of the cross-member 4; and
a screw 11 and a spacer device 12 associated with the upright 2.

A central tapped bore 14 of axis substantially coinciding with the line L can be formed through the nut 10. The nut 10 typically presents two opposite flats 15 on its peripheral surface.

The nut 10 can be mounted at the lateral end 5 of the cross-member 4 via, for example, a plate 16, a sleeve 18, and an antirotation cage 20.

The plate 16 is typically substantially circular and can present a central orifice 22 for passing the shank 24 of the screw 11. The orifice 22 is typically of a diameter greater than that of the shank 24. The shank 24 typically has an outside thread, which thread is, for example, right-handed.

Figure 2:
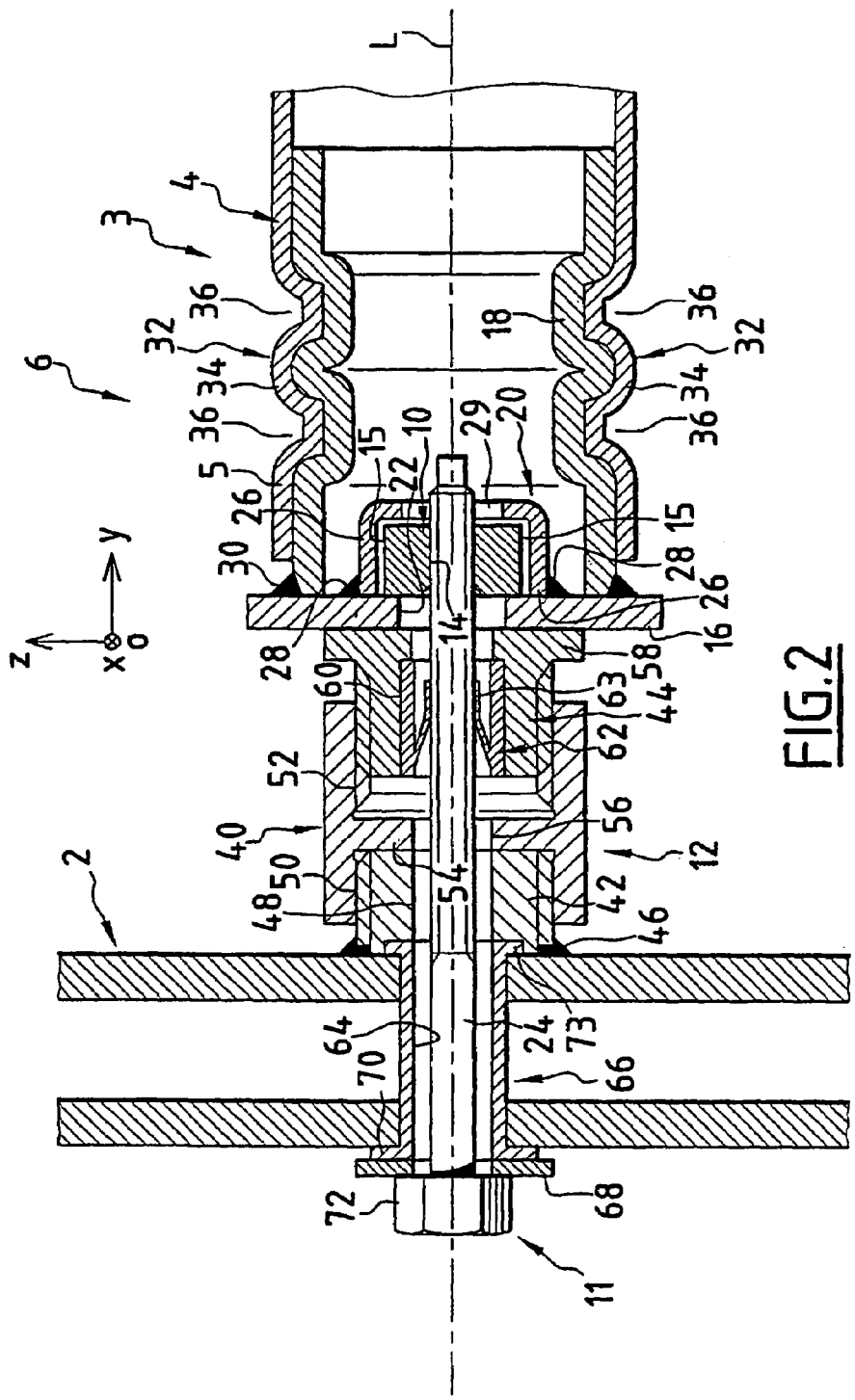
FIG. 2 is an enlarged diagrammatic cross-section view of the portion of FIG. 1 in circle II.

The antirotation cage 20 is formed by, for example, a metal strip whose ends 26 are folded laterally outwards, i.e. to the left in FIG. 2, so that the cage 20 is substantially U-shaped facing to the left in FIG. 2.

The ends 26 of the antirotation cage 20 are typically secured, e.g. by welds 28, to the right-hand face of the plate 26. An orifice 29 for passing the shank 24 of the screw 11 is typically formed in the central region of the cage 20, in register with the tapped bore 14. This orifice 29 can be of a diameter greater than that of the shank 24.

The ends 26 of the cage 20 can be located facing the flats 15 so as to bear against the ends 26 when the nut 10 tends to pivot about the axis of its tapped bore 14 relative to the cage 20. The ends 26 of the cage 20 can thus retain the nut 10 preventing it from turning about the director line L.

The cage 20 is typically astride the nut 10 with vertical clearance, i.e. in the direction Oz, which clearance is, for example, about 4 millimeters (mm) between each of the ends 26 and the corresponding flat 15.

Figure 3:
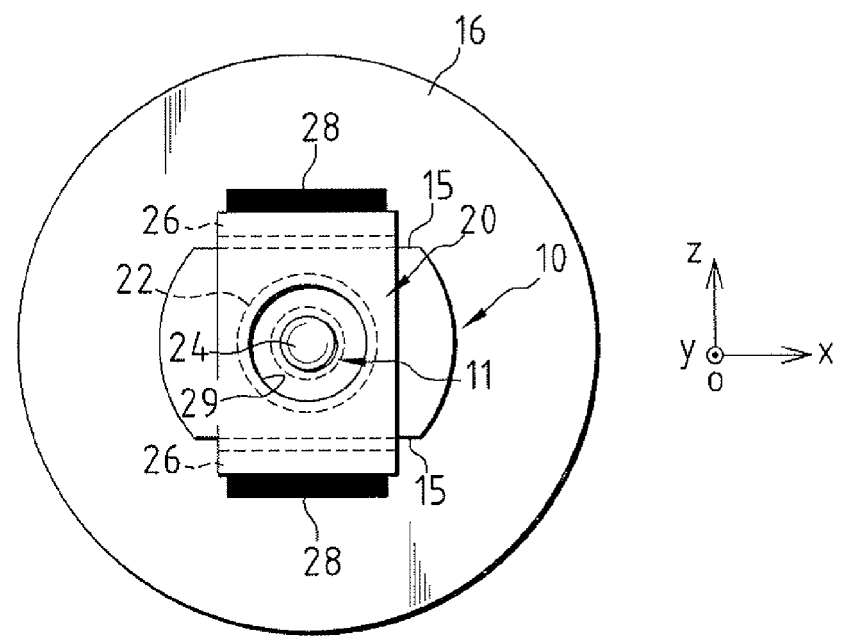
FIG. 3 is a fragmentary diagrammatic end view as seen looking along arrow y in FIG. 2.

The cage 20 may not extend in front of and behind the nut 10, i.e. to the right or the left in FIG. 3. Thus, the nut 10 can be moved freely in translation along the direction Ox relative to the cage 20 and to the plate 16.

In this way, the nut 10 can float in the cage 20 and can move in translation relative thereto, for example, perpendicularly to the axis L of its tapped bore 14, typically both in the direction Ox and in the direction Oz.

The sleeve 18 can be a metal sleeve that is initial circularly cylindrical and welded to the plate 16 by a fillet 30. The sleeve 18 typically surrounds the cage 20 and can extend the plate 16 to the right.

The sleeve 18 is typically received in the end 5 of the cross-member 4. The sleeve 18 can be fastened to the cross-member 4 by, for example, crimping. This crimping can be performed in two diametrically-opposite regions 32, for example. Each region 32 typically extends over an angle of about 120° about the director line L, for example. This crimping can form a bulge 34 in each region 32 together with two grooves 36 disposed on either side of the bulge 34.

By crimping, the cage 2 can be fastened to the end 5 of the cross-member 4.

The spacer device 12 typically comprises:
a base body 40;
a bushing 42 for mounting the body 40 on the upright 2; and
a bearing element 44 for pressing against the plate 16.

The bushing 42 can be secured on the laterally inside face of the upright 2, e.g. by a weld 46. This bushing 42 can have an outside thread which is, for example, left-handed. The bushing 42 can also present a central orifice 48 for passing the shank 24 of the screw 11. The diameter of the orifice 48 is typically greater than the diameter of the shank 24.

The base body 40 can be substantially cylindrical in shape and can present a left bore 50 and a right bore 52 that can be separated by a partition 54, typically pierced by a central orifice 56 for passing the shank 24. The left and right bores 50 and 52 can be tapped with oppositely-handed threads. The bushing 42 can be screwed into the left bore 50 of the base body 40.

The bearing element 44 can have an outside thread that is, for example, right-handed, and can be screwed into the right bore 52 of the base body 40.

The right end of the bearing element 44 can comprise a disk 58 of diameter typically greater than the remainder of the element 44 for pressing against the left side face of the plate 16.

A stepped central bore 60 can be provided in the bearing element 44. Means 62 for turning the element 44, e.g. means in the form of a metal ring provided with spring blades 63, can be received in the bore 60. These means 62 can enable the shank 24 of the screw 11 to be inserted towards the right, but can rub against it so as to be caused to rotate together therewith. The means 62 for providing rotary drive can be fastened, e.g. snap-fastened, to the bearing element 44 in order to transmit thereto any rotary movement from the screw 11 about the line L.

The shank 24 of the screw 11 typically passes through the upright 2 via the central bore 64 of a part 66 that is provided in the upright 2. A washer 68 can be disposed between a left cheek plate 70 of the part 66 and the head 72 of the screw 11. The part 66 can also possess a right cheek plate 73 disposed between the bushing 42 and the right side face of the upright 2.

The cheek plates 70 and 73 of the part 66 are typically on opposite sides of the upright 2.

To mount the left end 5 of the cross-member 4 to the left upright 2, the procedure is as follows, for example.

Initially, the base body 40 can be screwed onto the bushing 42 that has previously been fastened to the upright 2. The bearing element 44 of the spacer device 12 can then be fully screwed into the right bore 52 of the base body 40, as exemplarily shown in FIG. 4. The right disk 58 of the element 44 can bear sideways against the right edge of the base body 40.

The end 5 of the cross-member 4 previously fastened to the sleeve 18 can be placed facing the spacer device 12. The shank 24 of the screw 11 is typically inserted into the part 66 and the mounting bushing 42 until, for example, its right-hand end is disposed at the entrance to the rotary drive means 62.

Figure 4:
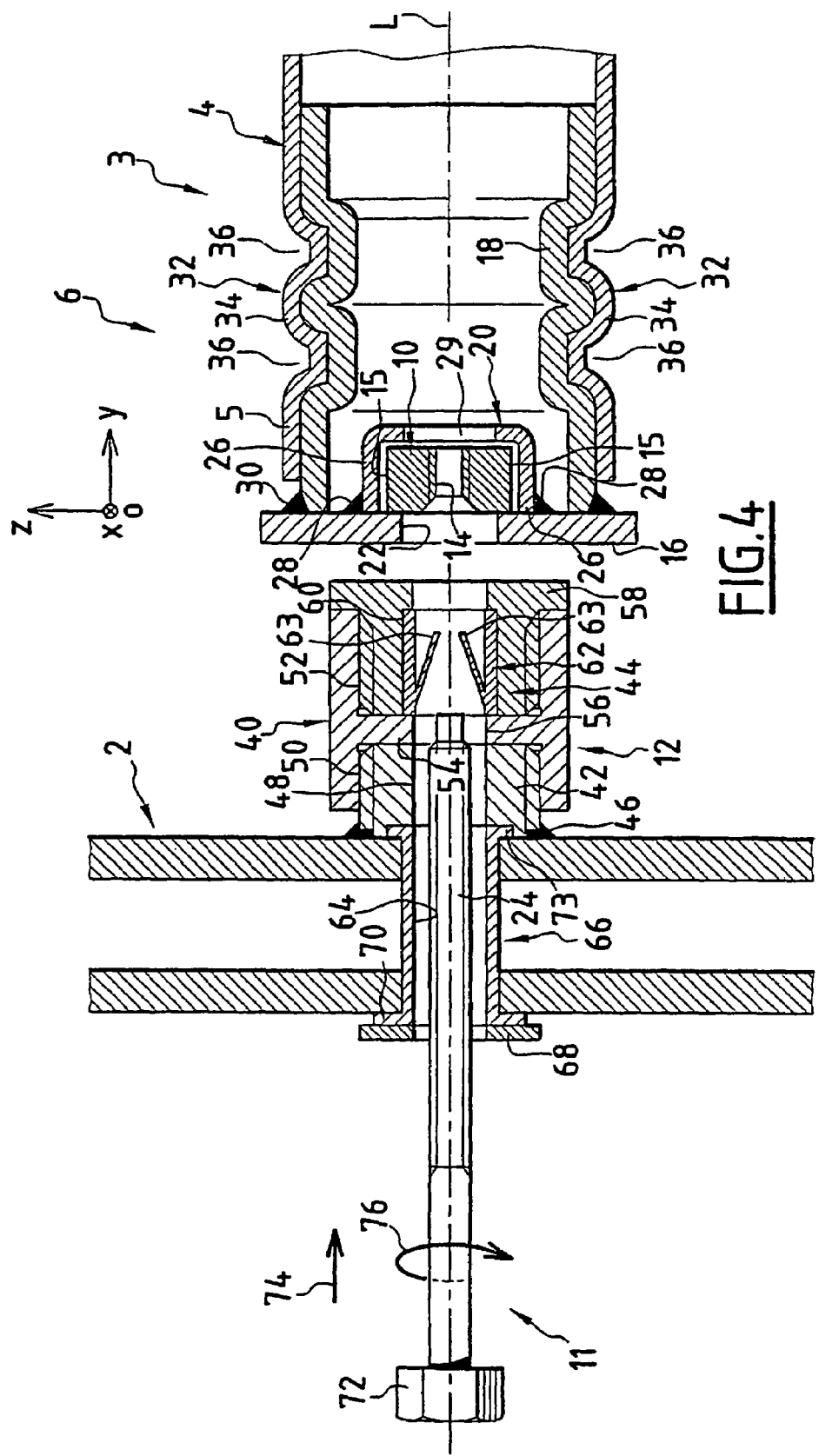
FIGS. 4 and 5 are views analogous to FIG. 2, showing two successive steps in fastening the cross-member to the upright of the FIG. 1 vehicle body.

Thereafter, horizontal thrust is typically exerted to the right on the screw 11, as represented by arrow 74 in FIG. 4, and the screw 11 can be turned clockwise about the director line L, as represented by arrow 76.

The front right end of the shank 24 of the screw 11 typically then penetrates into the ring 62, which can radially compress the blades 63.

The bearing element 44 can then be rotated by the screw 11 via, for example, the ring 62.

The base body 40 and the bushing 42 typically remain stationary relative to the left upright 2.

Figure 5:
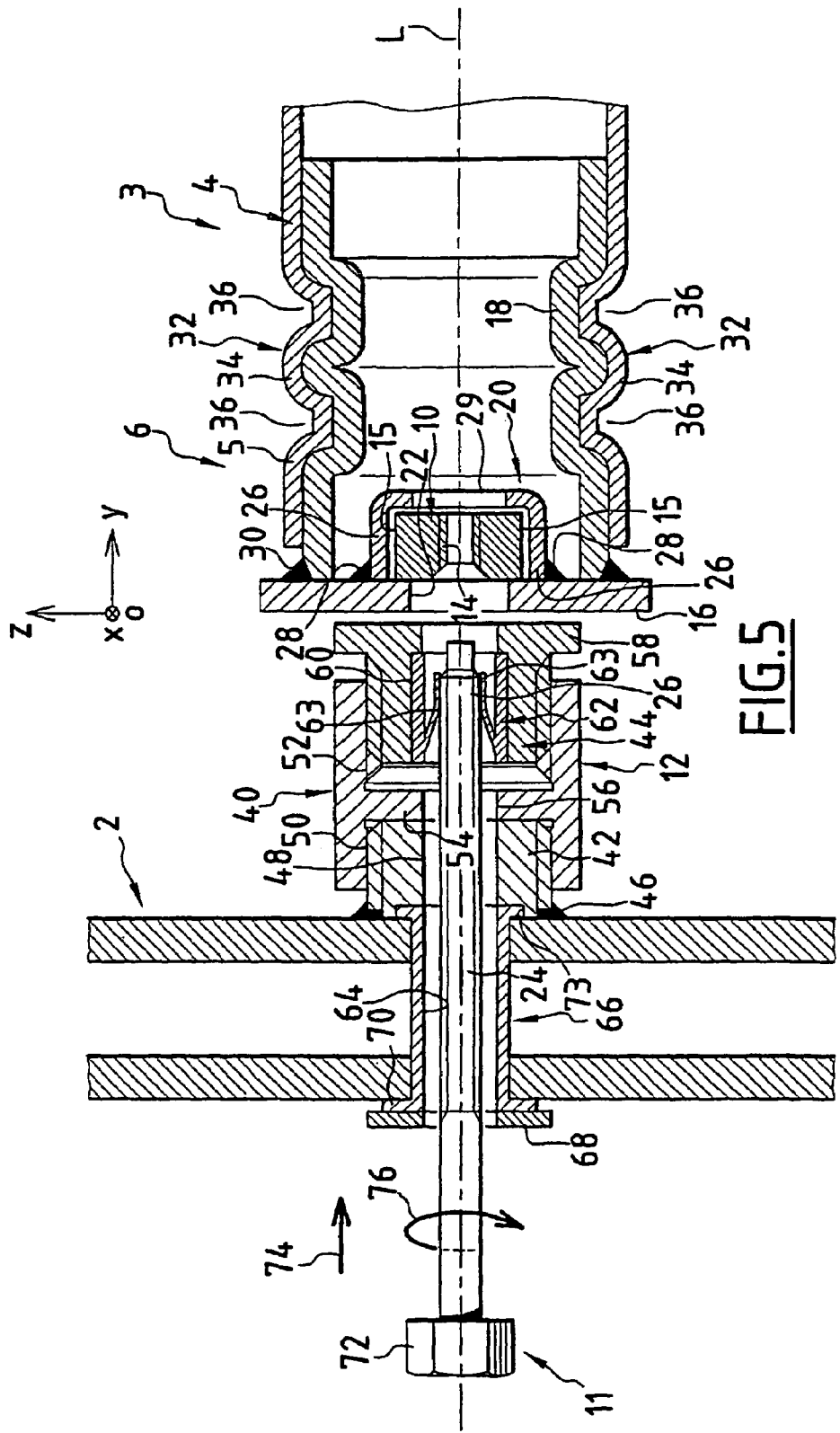

Because of the relative rotary movement between the base body 40 and the bearing element 44, and because of the co-operation between the thread of the element 44 and the tapping of the bore 52, the bearing element 44 can be moved in lateral translation to the right, typically substantially parallel to the director line L, as exemplarily shown in FIG. 5.

This movement can continue until, for example, the disk 58 of the bearing element 44 comes to press sideways against the plate 16.

The spacer device 12 can then bear sideways against the upright 2 and the plate 16, typically eliminating transverse clearance along the direction Oy.

The rotary movement of the screw 11 typically continues, and the screw 11 can advance to the right and can pass through the ring 62 until, for example, the right-hand end of the shank 24 is engaged in the tapped bore 14 of the nut 10. The cage 20 can then prevent the nut 10 from turning about the axis of its tapped bore 14, and allow a lateral clamping force to begin to appear.

The screw 11 can continue to be turned until, for example, a predetermined lateral clamping force is obtained between the cross-member 4 and the upright 2 via the spacer device 12.

The left side end 5 of the cross-member 4 can thus be securely fastened, for example, along the transverse direction Oy relative to the upright 2.

During assembly as described above, the possibility of moving the nut 10 in translation in the Oxz plane inside the cage 20 makes it possible to take up manufacturing tolerances and thus obtain satisfactory clamping typically along the direction Oy.

The use of an antirotation cage 20 in which the nut can move in translation orthogonally to the director line L thus enables manufacturing tolerances orthogonal to said director line to be taken up.

Nevertheless, the cost of the structural element 3 is small since, for the purpose of taking up clearances, it makes use, in some cases, only of an antirotation cage 20 in which the nut 10 is floatingly mounted in at least one direction orthogonal to the director line L.

The sleeve 18 can be fastened to the end 5 of the cross-member 4 by techniques other than crimping.

Figure 6:
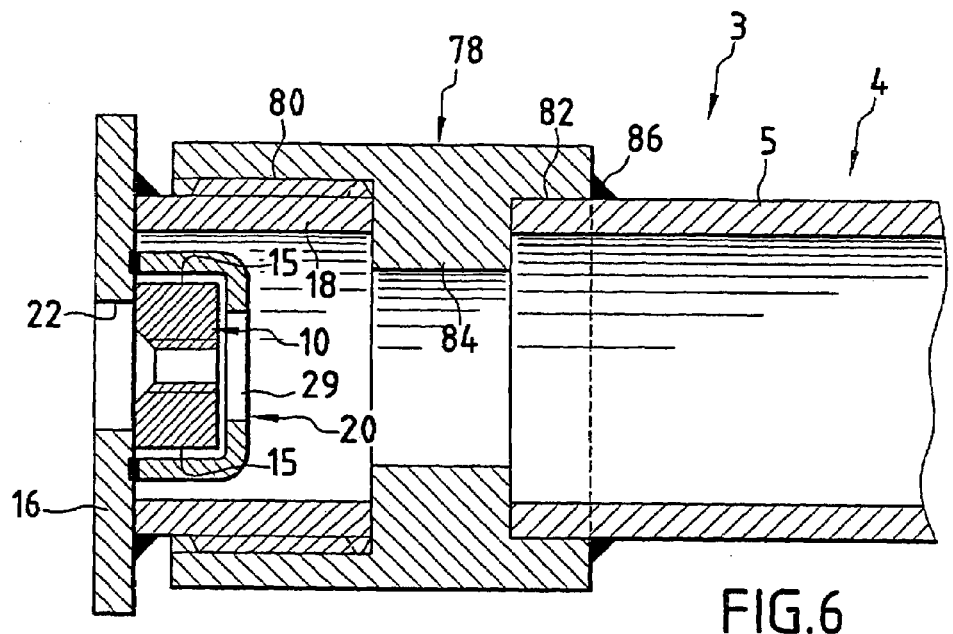
FIGS. 6 and 7 are diagrammatic fragmentary longitudinal section views of the ends of cross-members constituting two variants of the embodiment of FIGS. 1 to 5.

FIG. 6 thus shows a variant in which fastening is provided by means of an intermediate bushing 78. This bushing 78 can present a left bore 80 and a right bore 82 separated by a shoulder 84. The left bore 80 is typically tapped.

The sleeve 18 typically has an outside thread and can be screwed into the left bore 80 of the bushing 78. The thread of the sleeve 18 is typically right-handed.

The left end 5 of the cross-member 4 can be engaged in the right bore 82 of the member 78 and is secured or welded thereto, e.g. by a fillet 86.

Figure 7:
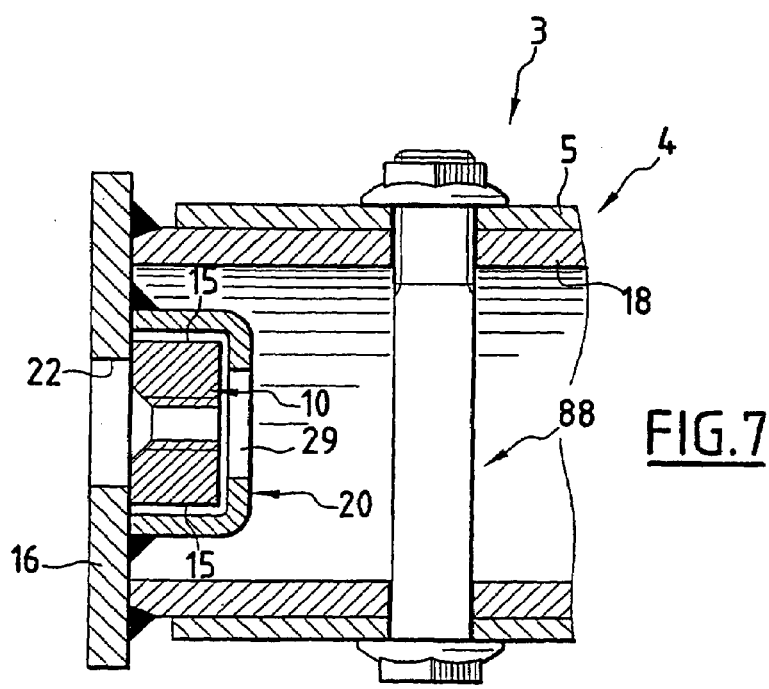

In the variant of FIG. 7, fastening between the sleeve 18 and the end 5 of the cross-member 4 is provided by a bolt 88 which passes through the sleeve 18 and the end 5, and which extends vertically, for example.

Other variants (not shown) of the fastening between the sleeve 18 and the end 5 can be provided, e.g. by riveting or by welding.

The various above-described fastening methods can be combined.

The second embodiment exemplarily shown in FIG. 8 can differ from the first essentially as follows.

The spacer device 12 is carried by the left side face of the plate 16.

More precisely, the spacer device 12 typically comprises a bushing 90 which can be made integrally with the plate 16 and extending it to the left. This bushing 90 can have a tapped bore 92 of axis that typically coincides substantially with the director line L.

The spacer device 12 can also comprise a second nut 94 provided with a tapped bore 95 typically substantially centered on the line L, and a second antirotation cage 96 in which the second nut 94 can be disposed. The second nut 94 and the antirotation cage 96 typically are constrained to rotate together about the axis L, but the second nut 94 can move, for example, in translation inside the cage 96 along the directions Ox, Oy, and Oz.

The antirotation cage 96 can have an outside left-hand thread and can screwed into the bore 92 of the bushing 90.

Thus, a helical connection can be established between the antirotation cage 96 and the end 5 of the cross-member to transform movement in rotation of the cage 96 into movement in translation, as described below.

The antirotation cage 96 typically has a central orifice 97 which can surround the shank 24 of the screw 11 remotely.

To fasten the left-hand end 5 of the cross-member 4 to the upright 2, the following procedure is followed, for example.

The left-hand end 5 of the cross-member 4, already fitted with the plate 16 and thus with the spacer device 12, is placed facing the shank 24 of the screw 11 which has previously been engaged in the part 66. This is exemplarily shown in FIG. 9.

Thereafter, the screw 11 can be pushed to the right, as represented by arrow 97, while simultaneously being turned, for example, about the line L in the clockwise direction as represented by arrow 98. The leading end of the shank 24 thus engages in the tapped bore 95 of the second nut 94.

Because of friction between the shank 24 of the screw 11 and the nut 94, the nut 94 is typically turned clockwise as is the cage 96 which is typically constrained to rotate with the nut 94.

This rotary movement can cause the antirotation cage 96 to move in translation to the left typically because of the handedness of the tapping in the bore 92 and of the thread on the outside of the cage 96.

The cage 96 typically continues to move to the left until it comes to bear laterally against the upright 2 via the right cheek plate 73 of the part 66.

The spacer device 12 typically then extends between the plate 16 and the upright 2.

The screw 11 can continue to be turned and it can move laterally to the right because of co-operation between the tapping in the nut 94 which is now prevented from turning due to the cage 96 bearing against the part 66.

The shank 24 can move laterally to the right until it engages in the tapped bore 14 of the nut 10.

The screw 11 typically then causes a transverse clamping force to begin to be exerted in the direction Oy causing the left-hand end 5 of the cross-member 4 to press against the upright 2. Once the desired clamping force has been reached, turning of the screw 11 can be stopped.

Figure 8:
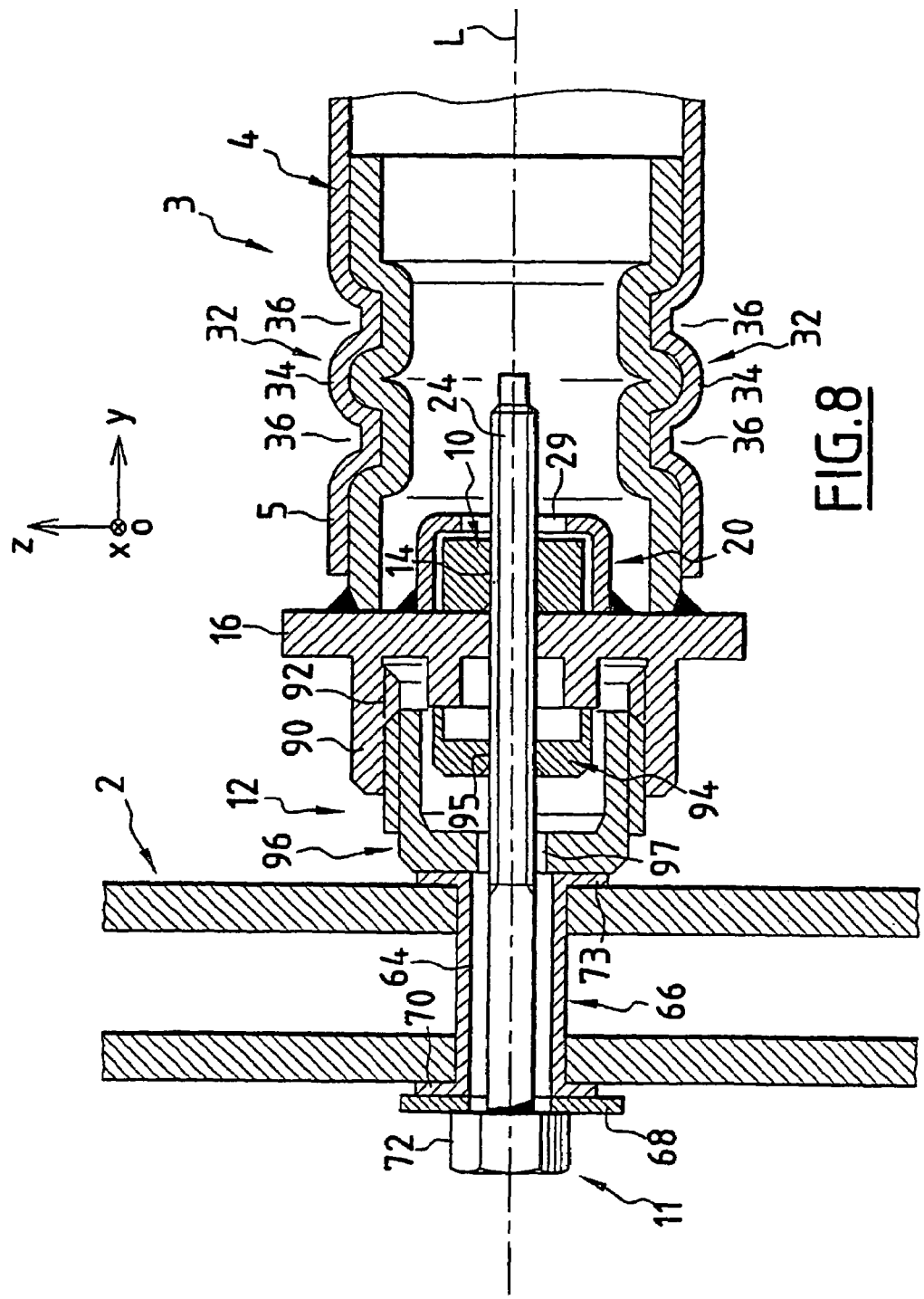
FIG. 8 is a view analogous to FIG. 2 showing a second embodiment of the invention.

The system is then in the configuration exemplarily shown in FIG. 8. The left-hand end 5 of the cross-member is typically firmly secured transversely to the upright 2. The body 1 as obtained in this way is better at withstanding the stresses that appear in the event of the vehicle colliding against obstacles.

In addition, during such a collision, the point of the connection between the upright 2 and the cross-member 4 that is subjected to the greatest stress is situated at the first nut 10.

Thus, it is only the tapping 14 of the nut 10 that needs to be adaptive to withstand such stresses. The tapping 95 of the nut 94 can be tapping of medium mechanical strength so that deployment of the spacer device 12 is not impeded.

In addition, the floating mount of the nut 10 in the antirotation cage 20 and of the nut 94 in the antirotation cage 96 can enable tolerances to be taken up in the direction Ox and Oz.

Figure 9:
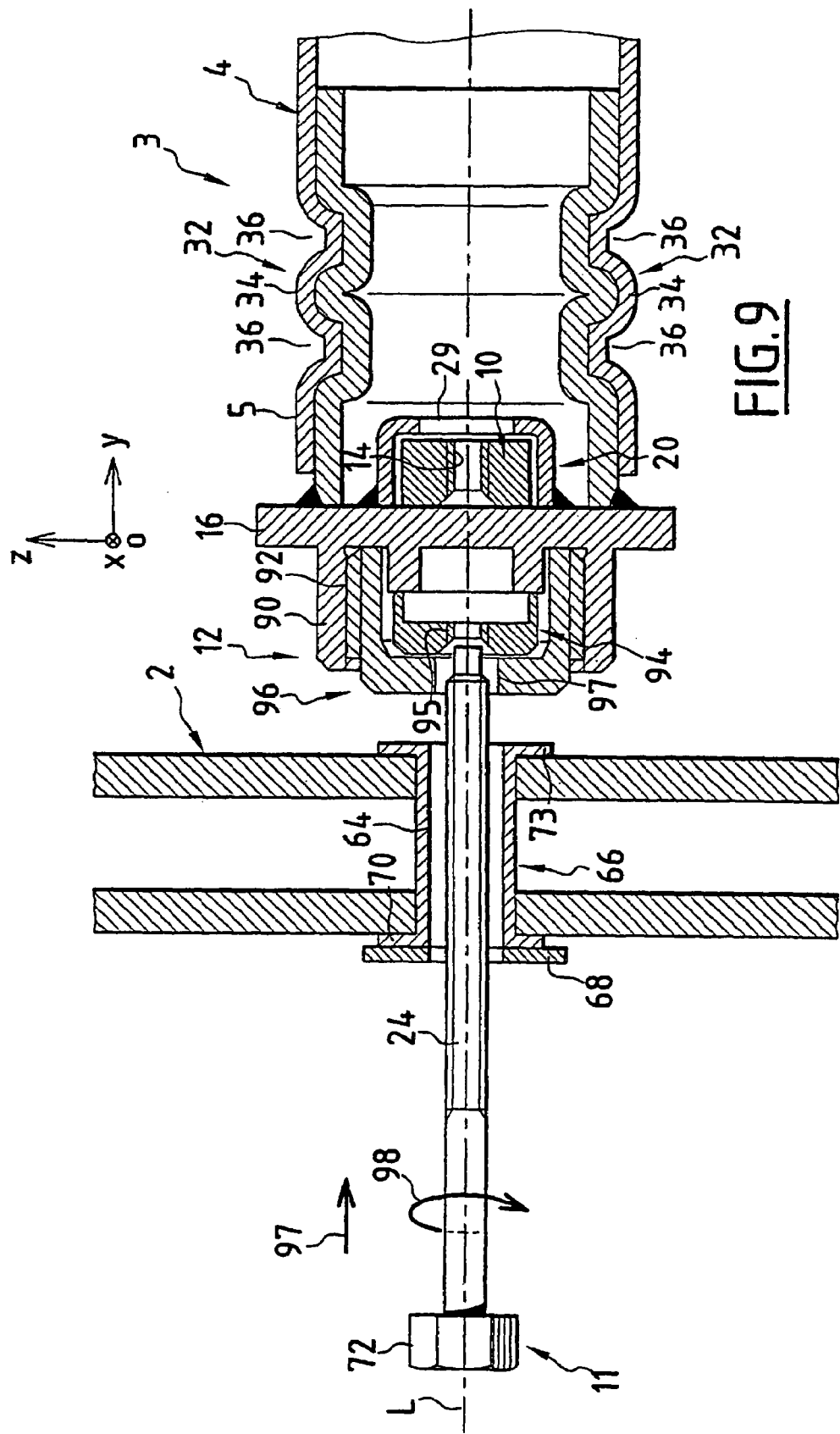
FIG. 9 is a view analogous to FIG. 8 prior to the cross-member being fastened to the upright.

The structural element 3 of FIGS. 8 and 9 is therefore of low cost.

Figure 10:
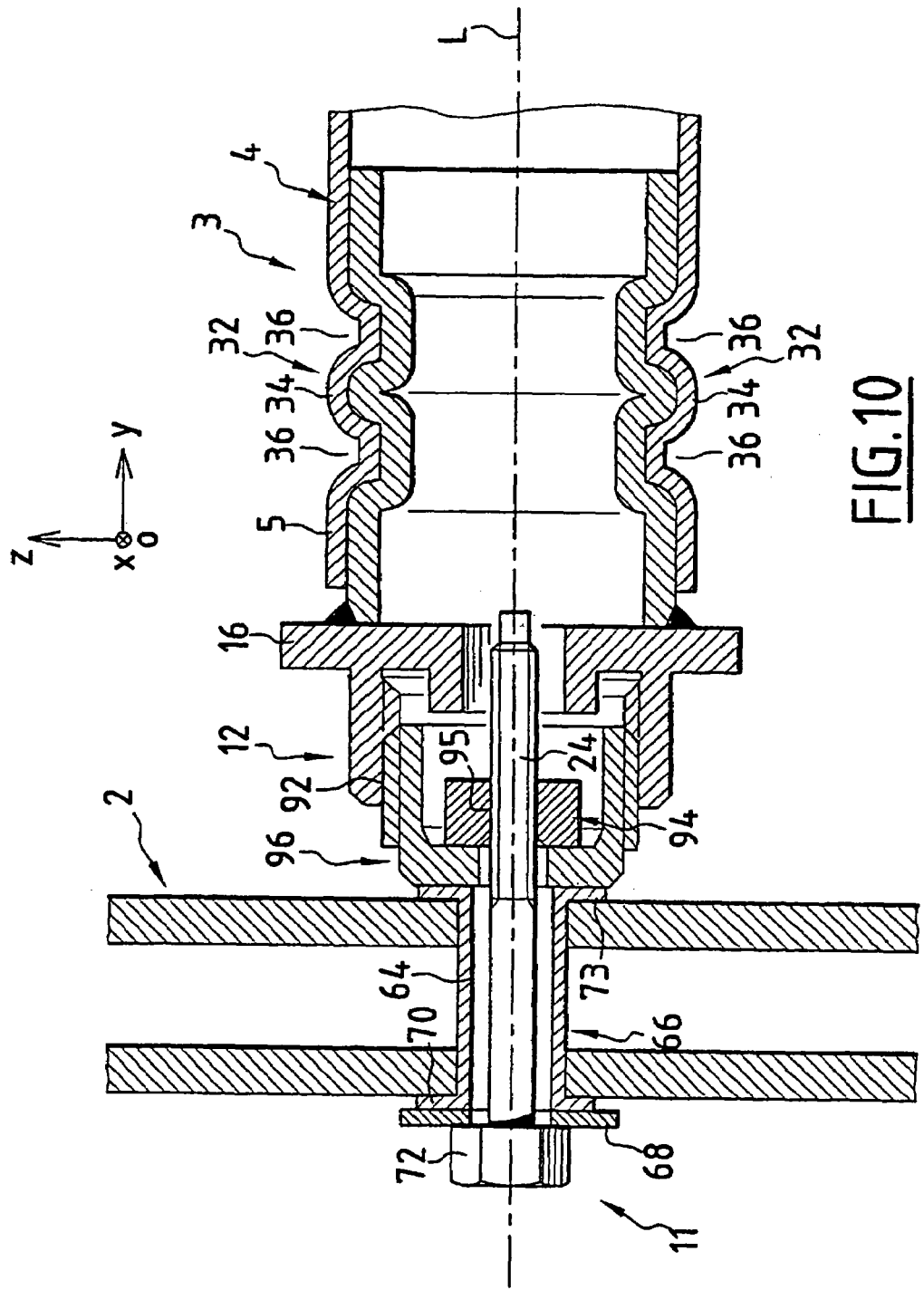
FIG. 10 is a view analogous to FIG. 2 showing a third embodiment of the invention.
Figure 11:
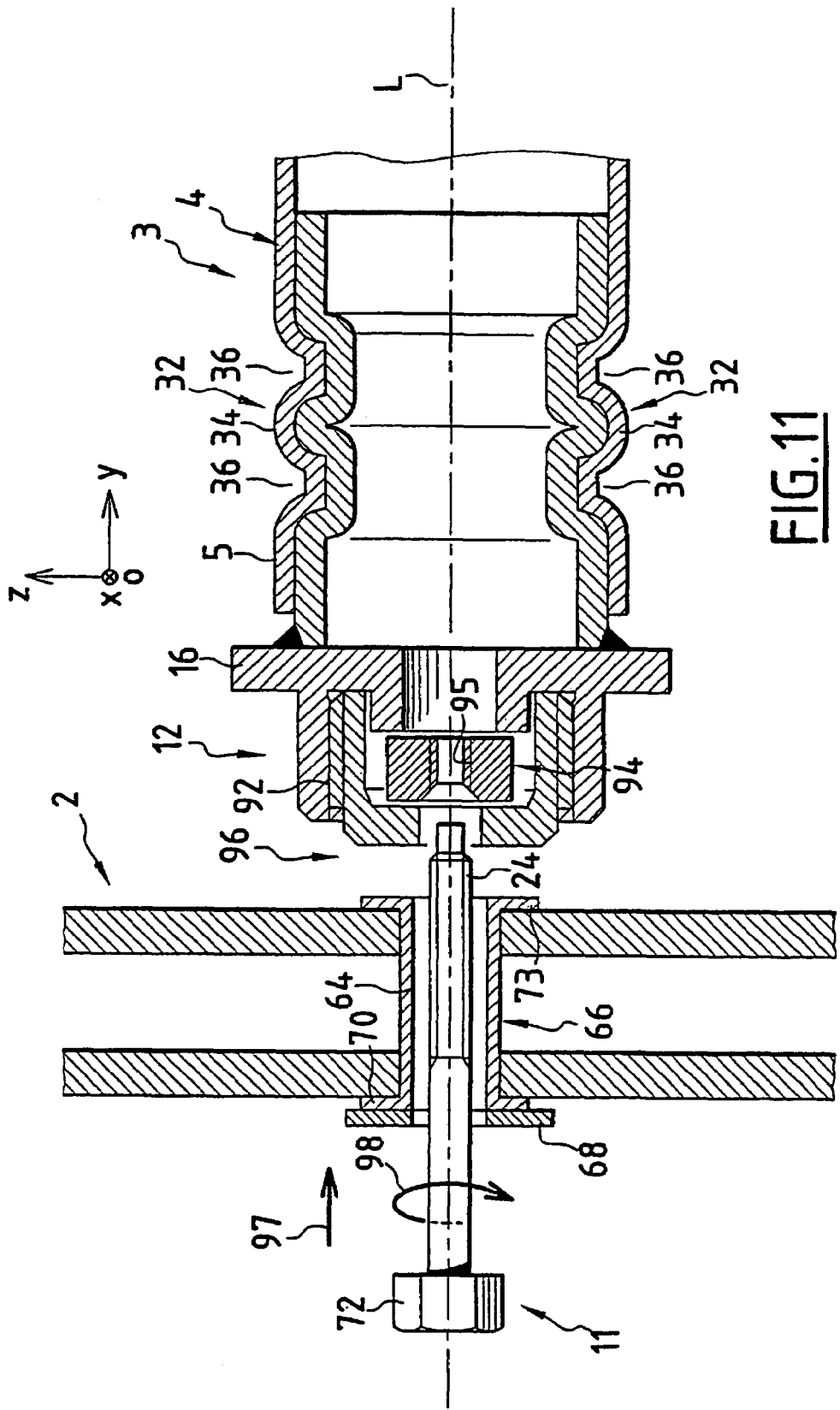
FIG. 11 is a view analogous to FIG. 10 prior to fastening the cross-member to the upright.

FIG. 10 exemplarily shows a third embodiment which is of even lower cost.

This embodiment can differ from that described with reference to FIGS. 8 and 9 in that the first antirotation cage 20 and the first nut 10 are omitted.

Clamping along the director line L is then provided by the nut 94 which floats in the antirotation cage 96. Mounting of the end 5 to the upright 2 is then initially performed in a manner analogous to that described with reference to FIGS. 8 and 9.

When the antirotation ring 96 bears transversely against the upright 2, the screw 11 can continue to be turned until its head 72 comes to bear against the washer 68 and the nut 94 bears transversely against the cage 96. Transverse clamping then begins and is interrupted once a desired level of torque has been reached.

This embodiment which makes use of two pieces fewer than the embodiment of FIGS. 8 and 9 is less expensive. However, the greatest stresses in the event of an accident can appear in the shank 24 at the nut 94. The nut 94 should then be capable of taking up forces at a level that puts manufacturing constraints on its tapping 94, for example concerning the pitch of its thread, and that can lead to deployment of the device 12 being slower.

The principles described above can be applied to structural elements 3 other than those comprising a cross-member 4 for supporting a dashboard. In particular, they can be used for making seats or exhaust systems for motor vehicles.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A motor vehicle structural element of the type comprising a cross-member and, at at least one end of the cross-member, a first nut presenting a tapped bore for receiving a screw for fastening the cross-member to an upright of the vehicle, an axis of the bore being substantially parallel to a director line of the cross-member, the element comprising a first cage for preventing the nut from turning about the axis of its tapped bore, the first cage being mounted at said end of the cross-member, and the nut being free to move in the first cage in translation substantially perpendicularly to the axis of its bore, and a spacer device for co-operating with the screw to abut against the end of the cross-member and against the upright along the director line of the cross-member.

2. The element according to claim 1, wherein the first cage is mounted at the end of the cross-member by welding.

3. The element according to claim 1, wherein the first cage is mounted at the end of the cross-member by screw fastening.

4. The element according to claim 1, wherein the first cage is mounted at the end of the cross-member by crimping.

5. The element according to claim 1, including a sleeve via which the first cage is mounted to the end of the cross-member.

6. The element according to claim 5, further comprising a plate secured to the sleeve and on which the cage is provided.

7. A motor vehicle structural element of the type comprising a cross-member and, at at least one end of the cross-member, a first nut presenting a tapped bore for receiving a screw for fastening the cross-member to an upright of the vehicle, an axis of the bore being substantially parallel to a director line of the cross-member, the element comprising a first cage for preventing the nut from turning about the axis of its tapped bore, the first cage being mounted at said end of the cross-member, and the nut being free to move in the first cage in translation substantially perpendicularly to the axis of its bore, a spacer device for co-operating with the screw to bear against the end of the cross-member and against the upright along the director line of the cross-member, wherein a helical connection is provided between the first cage and the end of the cross-member, said helical connection being oppositely handed relative to the helical connection that arises from the screw being screwed into the first nut, so that the first cage comes to bear against the upright along the director line of the cross-member while the screw is being screwed into the first nut.

8. A motor vehicle structural element of the type comprising a cross-member and, at at least one end of the cross-member, a first nut presenting a tapped bore for receiving a screw for fastening the cross-member to an upright of the vehicle, an axis of the bore being substantially parallel to a director line of the cross-member, the element comprising a first cage for preventing the nut from turning about the axis of its tapped bore, the first cage being mounted at said end of the cross-member, and the nut being free to move in the first cage in translation substantially perpendicularly to the axis of its bore, a spacer device for co-operating with the screw to bear against the end of the cross-member and against the upright along the director line of the cross-member, wherein the spacer device comprises a second nut presenting a tapped bore for receiving the screw, the axis of the bore being substantially parallel to the director line of the cross-member, said spacer device further comprising a second cage for preventing the second nut from turning about the axis of its bore, and a helical connection is provided between the second cage and the end of the cross-member, said helical connection being oppositely handed relative to the helical connection that arises from screwing the screw into the second nut, so that the second cage comes to bear against the upright along the director line of the cross-member while the screw is being screwed into the second nut.

9. The structural element according to claim 1, wherein the cross-member is a cross-member for a supporting a motor vehicle dashboard.

10. A motor vehicle comprising:
   a dashboard; and
   a structural element of the type comprising a cross-member and, at at least one end of the cross-member, a first nut presenting a tapped bore for receiving a screw for fastening the cross-member to an upright of the vehicle, an axis of the bore being substantially parallel to a director line of the cross-member, the element comprising a first cage for preventing the nut from turning about the axis of its tapped bore, the first cage being mounted at said end of the cross-member, and the nut being free to move in the first cage in translation substantially perpendicularly to the axis of its bore, and a spacer device for co-operating with the screw to abut against the end of the cross-member and against the upright along the director line of the cross-member.

* * * * *